UNITED STATES PATENT OFFICE.

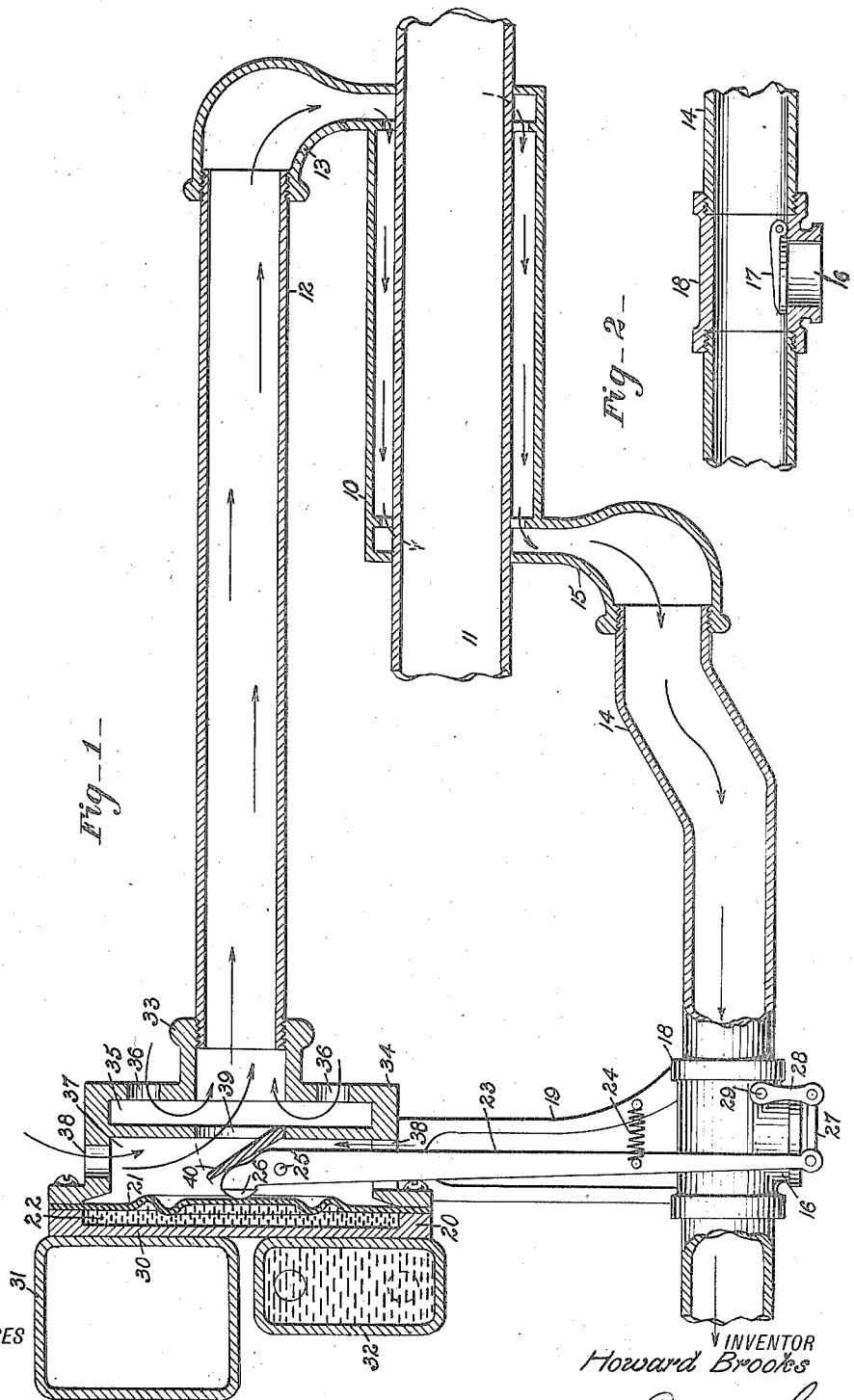

HOWARD BROOKS, OF EL PASO, TEXAS.

AIR HEATING AND REGULATING MEANS FOR INTERNAL-COMBUSTION ENGINES.

1,295,000.     Specification of Letters Patent.     Patented Feb. 18, 1919.

Application filed August 28, 1917. Serial No. 188,676.

*To all whom it may concern:*

Be it known that I, HOWARD BROOKS, a citizen of the United States, and a resident of El Paso, in the county of El Paso and State of Texas, have invented a new and Improved Air Heating and Regulating Means for Internal-Combustion Engines, of which the following is a full, clear, and exact description.

My invention relates to an air heater to be applied to an internal combustion engine for utilizing the heat generated in the operation of the engine and supplying the heated air to the carbureter to produce the fuel mixture.

An object of the invention is to automatically control the temperature of the air delivered to the carbureter from the heater by regulated admission of cold air to the delivery pipe proportionate to an increase in engine speed and the consequent increase in the heat of compression generated in the motor cylinders, to thereby unfailingly deliver the air at a proper temperature to supply to the engine a highly explosive mixture suited to the degree of heat generated in the engine under varying conditions of the engine speed, so that a hotter fuel mixture will be supplied to the intake manifold under slow engine speeds than under high engine speed.

A further object of the invention is to automatically compensate the chilling effect of cold jacket water by an increased temperature of the intake fuel.

More specific objects are to provide efficient thermostatic controlling means arranged to actuate a valve controlling admission of cold air to the hot air delivery pipe leading to the carbureter, and to provide for retarding the action of the thermostat under slow speeds through the medium of a cold air current over the thermostat.

The nature of the invention and its advantages will more clearly appear as the description proceeds.

Reference is to be had to the accompanying drawings forming a part of this specification in which similar reference characters indicate corresponding parts in both views.

Figure 1 is partly a sectional side elevation of an air heating and regulating means embodying my invention, showing the same in connection with a portion of an engine exhaust pipe, a portion of an intake manifold, and a portion of a box or tube forming part of the circulating system for the cooling water of the engine;

Fig. 2 is a fragmentary longitudinal vertical section to show the valve controlling the admission of cold air to the hot air delivery pipe.

In carrying out my invention in accordance with the illustrated example, a heater 10 is provided in the form of a shell which surrounds the exhaust pipe 11 of the engine and spaced therefrom. An air supply pipe 12 leads to the heater through a head 13. The numeral 14 indicates the hot air delivery pipe connected with the heater in any suitable manner as by a fitting 15, said delivery pipe leading in practice to the carbureter (not shown).

An inlet 16 is provided in the hot air delivery pipe 14 for the admission of cold air thereto, said inlet being controlled by a valve 17, the inlet and valve in the present example being in a coupling element 18 interposed in said delivery pipe and supported by a suitable frame or other part 19.

The cold air admission valve 17 is controlled by a suitable heat-responsive device, there being utilized in the illustrated example a diaphragm thermostat 20 which may be of any approved form, and it will be understood that any other heat-responsive device may be employed. The numeral 21 indicates the diaphragm of the thermostat, and 22 an expansive fluid preferably mercury. The expansion of the diaphragm actuates a lever 23 subject to the resistance of a spring 24. The lever is fulcrumed as at 25 near one end thereof and said end presents a lateral member 26 bearing against the diaphragm. The opposite end of the lever is suitably connected with the valve 17 as by links 27, 28, the latter being on the rock shaft 29 of the valve. The back 30 of the thermostat in the preferred arrangement is juxtaposed to a side of the intake manifold indicated conventionally at 31 and juxtaposed also to a part of the circulating system of the cooling water, there being indicated a box 32 which may be interposed in said system.

The arrangement is such that the thermostat is subject at the same time to the heat in the intake manifold and to the temperature of the water in the cooling system, to cause an expansion of the thermostat to actuate the lever 23 in a manner to open the valve 17 for the admission of cold air through the inlet 16.

The particular advantage of having the thermostat associated with both the intake manifold and with the circulating system (as by box 32) is that cold water in the circulating system counteracts the heat generated in the intake 31, and therefore, the gas in the intake manifold will have imparted thereto a degree of heat varying with the temperature of the water in the jackets.

Again, when the motor is operating slowly and compression in the cylinders therefore is not high, there will be less heat of compression in the fuel charge in the cylinders than when the motor is operating at high speed, and the compression is higher and, to compensate this difference in temperatures I provide for causing cold air to pass over the thermostat under the suction in the carbureter, in such a manner that the thermostat is cooled sufficiently to retard its action and to require an increased temperature in the intake manifold for influencing the thermostat to the required extent. To obtain the stated cooling effect of the air current on the thermostat the air supply pipe 12 of the heater is suitably connected as by a nipple 33 with a box 34 having an air chamber 35 provided with cold air inlets 36 and communicating with the pipe 12. The box is further provided with a second air chamber 37 directly adjacent to the thermostat and having the rear wall of the chamber formed by the diaphragm 21. Said chamber 37 has cold air inlets 38, one of which may be utilized for accommodating the lever 23 and said chamber communicates by an outlet 39 through the chamber 35 with the supply pipe 12. The outlet 39 is controlled by a valve 40 which is subject to the suction produced in the carbureter and hence in the heater 10. The valve 40 advantageously may be a gravity valve, as shown, to normally tend to maintain its open position resting against a suitable support which may be the back of the adjacent arm of the lever 23. With the described arrangement when the engine is operating under very low speed, less heat will be developed in the exhaust 11 and therefore in the heater 10 since, due to the low compression in the cylinders under low speeds, there will be developed less heat of compression, and the air supplied to the carbureter will in this case consist of the heated air passing to the delivery pipe 14 from the heater. The cold air over the diaphragm 21 serves to retard the functioning of the thermostat as the engine speed increases, and upon a material increase of engine speed, the increased suction developed in the carbureter will increase the speed of the air passing over the valve 40 sufficient to close the said valve, thereby preventing the cooling of the diaphragm 21 by the air current so that the thermostat may more readily respond to the heat of the intake manifold and circulating system and proportionately actuate the lever 23 controlling the cold air admission valve 17. The capacity of the heater 10 should be such that sufficient hot air will be furnished while the engine is running slowly with cold water in the jackets and at the lowest temperature under which the engine will be required to operate.

If the thermostat 20 is of a type to be readily adjusted, the throw of the lever 23 may be varied by the adjustment of the thermostat to suit atmospheric temperatures. Otherwise the spring 24 may be of a type permitting of the tension being varied to alter the resistance offered to the lever. If desired a spring 24 of different strength may be employed under different conditions of atmospheric temperature.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. Air heating and regulating means for the carbureter of an internal combustion engine, including air heating means dependent on the engine as a source of heat to be subjected to varying heat conditions of the engine under different speeds, a delivery pipe adapted to connect the heater and carbureter to deliver heated air to the latter, said delivery pipe having a cold air admission, a temperature responsive device dependent on varying heat from the engine and adapted to control the said cold air admission, and means governing said temperature responsive device and subject to increase of suction in the carbureter to regulate the admission of cold air to the delivery pipe under different conditions of engine speed.

2. Air heating and regulating means for the carbureter of an internal combustion engine, including air heating means dependent on the engine as a source of heat to be subjected to varying heat conditions of the engine under different speeds, and temperature regulating means for the air, said regulating means comprising a valve controlled cold air inlet, a temperature responsive device subject to heat from the engine and governing the cold air inlet valve, means to produce a counter-acting cold air current against the heat responsive device to retard functioning thereof under low engine speeds, and means responsive to increased engine speed to induce or to cut off said air current.

3. Air heating and regulating means for the carbureter of an internal combustion engine, including air heating means dependent on the engine as a source of heat to be subjected to varying heat conditions of the engine under different speeds, temperature regulating means for the air, said temperature regulating means being adapted to be subjected to varying heat conditions of the engine and tending directly to respond to variations of the engine heat, and means subject to varying engine speeds to retard the response of said temperature regulating means to engine heat, under low engine speed.

4. An air heating and regulating means for the carbureter of an internal combustion engine, including an air heater, air heating means, means to heat the first means by the variable heat generated by the engine under different speed conditions, a hot air delivery pipe leading from the said heater and adapted for connection with a carbureter to supply heated air thereto and whereby to subject the air in the heater to the suction produced in the carbureter by the operation of the engine, said delivery pipe having a cold air inlet, a thermostat adapted to be disposed relatively to heated parts pertaining to the engine to be subject to the heat thereof, a valve subject to the thermostat and controlling the cold air inlet of the delivery pipe, an air chamber directly adjacent to the thermostat, said chamber having a cold air inlet, and having an outlet in communication with the heater, a second cold air inlet communicating with the heater independent of the said chamber, and a valve controlling the outlet of air from said chamber and subject to the suction produced in the heater.

5. In an apparatus of the class described, the combination with a heater dependent on the engine as a source of heat, an air supply pipe for the heater, a hot air delivery pipe leading from the heater and adapted to be connected with a carbureter, said delivery pipe having a cold air inlet, a valve controlling said cold air inlet, a thermostat adapted to be subjected to heat from the engine, means subject to the thermostat and controlling the said valve, a structure associated with the thermostat and connected with the air supply pipe of the heater, said structure having a cold air chamber directly adjacent to the thermostat and formed with air inlets, said chamber having an outlet in communication with the said supply pipe, there being an air inlet in said structure independent of said chamber and communicating with the supply pipe, and a valve controlling said outlet and normally tending to remain open, the valve being subject to suction in the heater due to the suction produced in the carbureter, whereby to close the valve upon an increase of suction.

6. An apparatus of the class described, including an air heating and delivering system adapted to be connected with a carbureter, a valve to admit cold air in the system under increased engine speeds, a second cold air inlet valve in the heating system and subject to suction produced in the carbureter to be closed by an increase in the suction, and thermostatic means governing said first-mentioned valve.

7. An apparatus for delivering air to a carbureter at different temperatures, for supplying a fuel mixture to an engine at different temperatures, said apparatus including an air heater, means to connect the heater with the carbureter, means to admit cold air to the air passing to the carbureter from the heater, and thermostatic means governing the admission of the cold air, said thermostatic means being associated with both the engine intake manifold and with the cooling system to be subject to the heat conditions in both to require an increase of temperature in the intake to compensate for the chilling effect of cold water in the cooling system.

8. An apparatus for delivering air to a carbureter at different temperatures to produce a fuel mixture having different temperatures, said apparatus including means to deliver heated air to the carbureter, and thermostatically controlled means to vary the temperature of the delivered air, said thermostatically controlled means being subject to the heat of both the intake manifold and the cooling system.

9. An apparatus for delivering air to a carbureter at different temperatures to produce a fuel mixture at different temperatures to suit different engine speeds, said apparatus comprising air-supplying means adapted to be connected with the carbureter of the engine and including air heating means, thermostatically controlled means, under the influence of the heat of the intake manifold of the engine and tending directly to respond to said heat, to modify the air from the heating means before delivery to the carbureter, and means subject to increase of suction in the carbureter to retard, under slow speeds, the action of the thermostat in response to the heat to which it is subjected by the intake.

HOWARD BROOKS.